United States Patent [19]

Budnicki

[11] 4,223,652
[45] Sep. 23, 1980

[54] FUEL DELIVERY SYSTEMS

[76] Inventor: Xavier B. Budnicki, 117 Livingston Ave., Edison, N.J. 08817

[21] Appl. No.: 36,413

[22] Filed: May 7, 1979

Related U.S. Application Data

[63] Continuation of Ser. No. 855,155, Nov. 28, 1977, abandoned.

[51] Int. Cl.³ ............................................. F02B 33/00
[52] U.S. Cl. .................................. 123/440; 123/557; 123/552
[58] Field of Search ............ 123/122 E, 133, 119 EC; 60/276, 285

[56] References Cited

U.S. PATENT DOCUMENTS

| | | | |
|---|---|---|---|
| 3,362,387 | 1/1968 | Neumann et al. | 60/276 |
| 3,968,775 | 7/1976 | Harpman | 123/122 E |
| 3,986,486 | 10/1976 | Rabbiosi | 123/122 E |
| 4,012,906 | 3/1977 | Hattori et al. | 60/285 |
| 4,029,061 | 6/1977 | Asano | 60/276 |
| 4,040,394 | 8/1977 | Wahl et al. | 60/285 |
| 4,057,042 | 11/1977 | Aono | 60/285 |
| 4,062,337 | 12/1977 | Rivere | 60/276 |
| 4,085,719 | 4/1978 | Hamburg et al. | 123/122 E |
| 4,089,313 | 5/1978 | Asano et al. | 123/119 EC |
| 4,089,314 | 5/1978 | Bernecker | 123/122 E |

*Primary Examiner*—Charles J. Myhre
*Assistant Examiner*—Raymond A. Nelli
*Attorney, Agent, or Firm*—Arthur L. Plevy

[57] ABSTRACT

A fuel delivery system employs an evaporation chamber which preheats the fuel by means of exhaust gases prior to injection of the fuel into a carburetor. A solenoid valve operates to control the amount of fuel introduced into the evaporation chamber and the valve is controlled in operation by means of a selector circuit which controls the operation of the valve and hence, the flow of fuel according to the speed of the engine, the pollutant content of the exhaust gases, and the temperature at which the engine is operating at.

8 Claims, 4 Drawing Figures

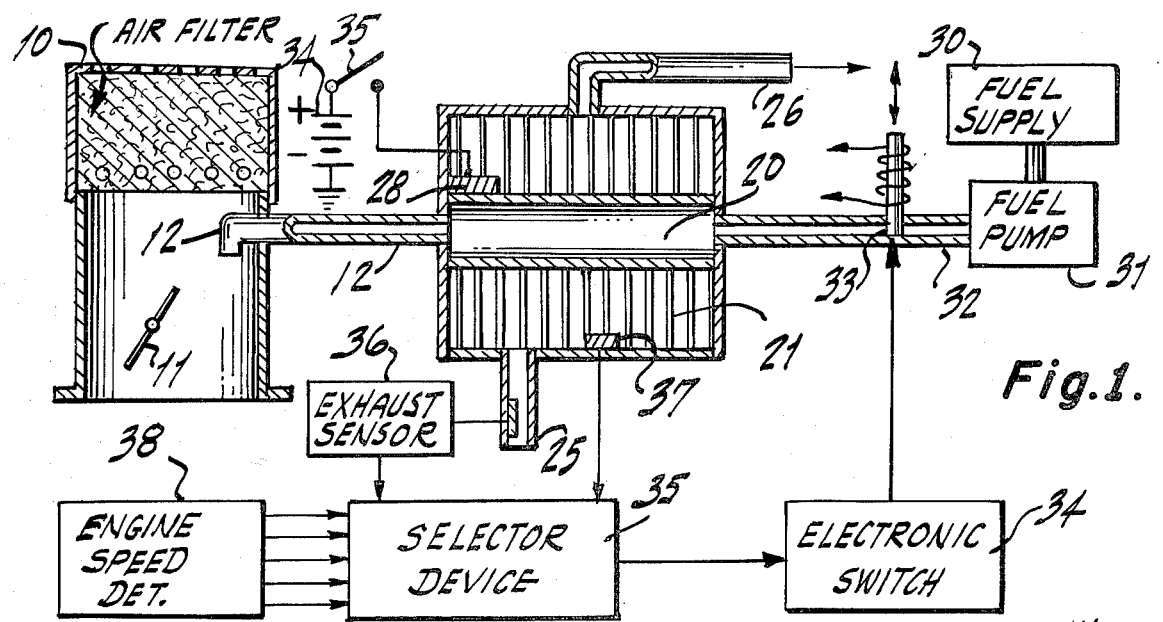
Fig.1.
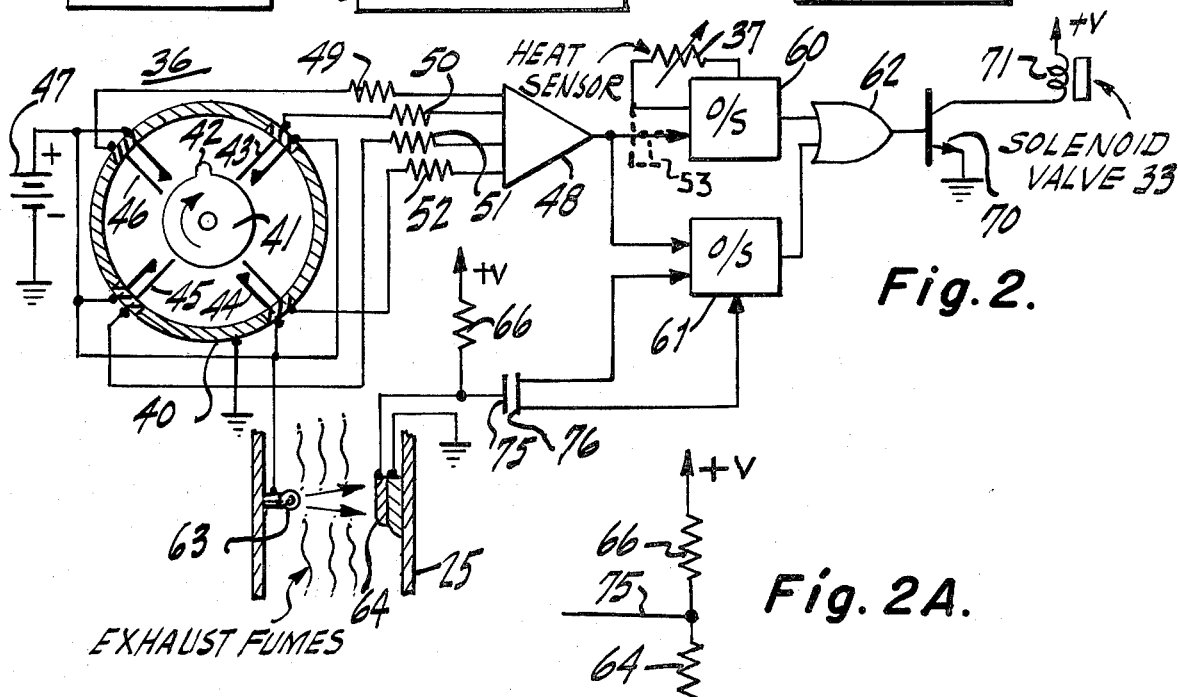
Fig.2.
Fig.2A.
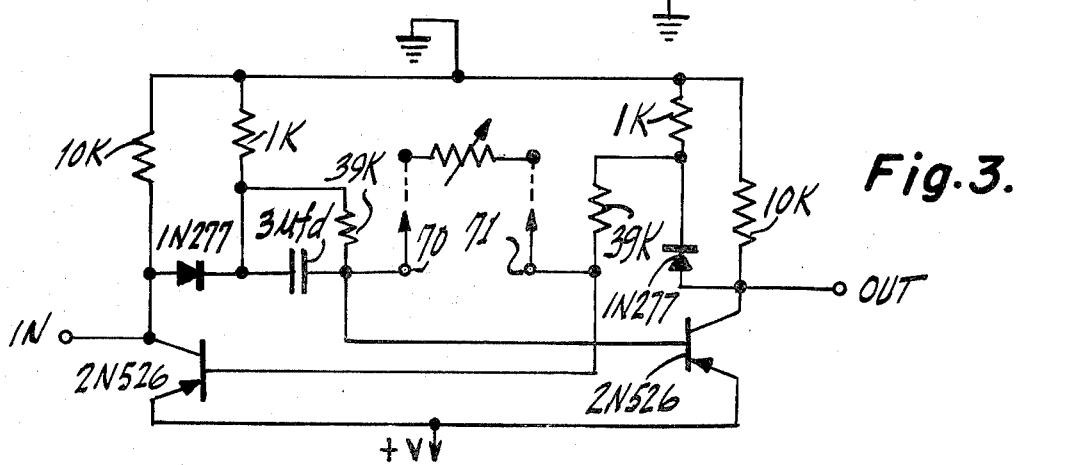
Fig.3.

FUEL DELIVERY SYSTEMS

This is a continuation of application Ser. No. 855,155, filed Nov. 28, 1977 now abandoned.

BACKGROUND OF INVENTION

This invention relates to a fuel system particularly adapted for internal combustion engines and more particularly to a fuel control system which enables more efficient burning and utilization of fuel.

There is a great deal of concern regarding pollutants which are emitted from the exhausts of automobiles and similar apparatus. Basically, there are presently available a number of anti-pollution devices as catalytic converters and so on which are being employed in conjunction with present automobile engines to reduce pollution. The function of such devices, as indicated, is to reduce the amount of pollutants which are dispelled into the atmosphere due to the operation of internal combustion engines.

Essentially, the more efficient the burning of the fuel, the less pollutants which are emitted and it is acknowledged that a great deal of the deleterious substances emitted by such engines are due to the fact that the gasoline or fuel has not been fully burned. This fact besides the pollutant problem accounts for decreased efficiency, poor gas mileage and so on.

There are a number of patents which exist in the prior art which attempt to preheat the fuel prior to the ignition of the same and to thence utilize the engine exhaust gases or the engine's heat for vaporizing the fuel prior to introduction into the engine. The vaporization of fuel does provide for an improvement in efficiency and can serve to reduce the number of pollutants dispelled by the engine.

As indicated, patent such as U.S. Pat. No. 1,147,416 entitled A VAPORIZING DEVICE, U.S. Pat. No. 1,319,718 entitled KEROSENE VAPORIZATION FOR INTERNAL CONBUSTION ENGINES show and depict the concept of vaporizing fuel prior to ignition. Other patents as U.S. Pat. No. 1,326,000 entitled CARBURETOR as well as U.S. Pat. No. 3,380,442 and U.S. Pat. No. 3,765,382 show various ways and means of heating or evaporating fuel prior to ignition of the fuel during engine operation.

Essentially, the idea of vaporizing fuel by using engine heat in an internal combusion engine is fairly well known in the prior art and there are many ways as the above patents indicate of accomplishing the same.

In any event, such systems do not provide for an efficient way of monitoring the engine performance in order to determine that the engine is, in fact, operating at increased efficiency in spite of the fact that the fuel is preheated or vaporized prior to combustion. It is therefore an object of the present invention to provide apparatus to be used in conjunction with an internal combustion engine; which apparatus serves to monitor engine performance and adjust the amount of the fuel being fed to the engine on an automatic basis. These and further objects of the present invention afford an improved apparatus for obtaining greater engine efficiency and a cleaner exhaust in a simple and reliable manner.

The objects of this invention while described in regard to internal combustion engines, are applicable to various other types of engines, as will be described.

BRIEF DESCRIPTION OF PREFERRED EMBODIMENT

In combination with an internal combustion engine of the type including a fuel evaporation chamber which is heated by exhaust fumes from the engine, the improvement therewith of apparatus for controlling the amount of fuel injected into said evaporation chamber, comprising fuel supply means having an input conduit coupled to said evaportion chamber for introducing fuel thereto, selective valve means located in said conduit and operative in a first position to allow fuel to flow into said chamber and operative in a second position to restrain fuel flow, speed detecting means coupled to said engine and operative to provide a first control signal indicative of the speed of said engine, engine monitoring means coupled to said engine and operative to provide a second control signal at an output indicative of the efficiency of said engine, selector means responsive to said first control signal and said second control signal to provide at an output, a series of pulses at a repetition rate indicative of said speed and of a duration according to said efficiency, and means for applying said series of pulses to said selective valve means for operating the same in said first and second position according to said pulse series.

BRIEF DESCRIPTION OF FIGURES

FIG. 1 is a block diagram of a fuel delivery system according to this invention.

FIG. 2 is a schematic diagram of a control system employed in the apparatus depicted in FIG. 1.

FIG. 2A is the voltage divider formed by the photocell and resistor 66.

FIG. 3 is a circuit diagram of a multivibrator which can be used in this invention.

DETAILED DESCRIPTION OF FIGURES

Referring to FIG. 1, there is shown a carburetor assembly 10 which conventionally includes a throttle 11 which may be a throttle plate or a suitable valve mechanism as is conventional in a normal carburetor.

As is well known, the carburetor 10 functions to mix the gasoline with a predetermined amount of air to assure complete burning of the mixture. The fuel is introduced into the carburetor through an inlet pipe 12 which is, in this invention, coupled to an evaporation chamber 20. The evaporation chamber 20 is fabricated from a good heat conducting material such as steel and is surrounded by a plurality of heat conducting elements such as suitable fins or copper tubes which form a heat chamber 21. The heat chamber 21 is in good thermal contact with the evaporation chamber 20.

The exhaust gases produced by the engine are introduced into an inlet tube 25 and are caused to flow through the heat chamber 21 to thereby raise the temperature of the heat chamber and therefore of the evaporation chamber 20. An outlet pipe 26 is also coupled to the heat chamber 21 and serves to discharge the exhaust gases.

Fuel as stored in the gasoline tank or fuel supply storage chamber 30 of the automobile is pumped by means of a fuel pump 31 into the evaporation chamber 20 via a coupling pipe 32. The fuel pump 31 may be electrical or mechanical and is indicative of those pumps which are presently employed.

Located between the fuel pump and the evaporation chamber 20 is an electrically operated solenoid valve 33. The valve 33 as will be explained, when operated allows fuel to enter into the evaporation chamber 20. When the valve is not actuated, fuel cannot enter into the chamber 20. Accordingly, the fuel which may, for example, be gasoline, kerosene or some other typical fuel, is heated in the evaporation chamber 20 prior to injecting the fuel into the carburetor 10.

As can be ascertained, depending upon the temperature of the evaporation chamber 21, the fuel can be heated to a temperature sufficient to vaporize the same. In this manner, the exhaust gases which are produced by the combustion of the vaporized fuel and air mixture, are cleaner due to the efficient burning of a vaporized fuel as compared to a liquid fuel.

As can be ascertained, the main aspect of the apparatus thus described is to vaporize the fuel by using exhaust gases of the engine. In any event, it can also be ascertained that during engine startup, the exhaust gases are relatively cool and do not reach a high temperature until the engine has had sufficient operating time.

Accordingly, there is shown a heater element 28 which may be located in any convenient position on the evaporation chamber 20. The heating element may comprise a filament or heater coil which is heated from the automobile battery 34. This will initially serve to preheat the gasoline in order to start the engine.

A thermostat or temperature responsive switch 35 is located in series with the heating unit and battery and hence, when the temperature of the engine reaches a desired level, the thermostat 35 operates to disconnect the battery from the heater element, thus conserving additional engine energy.

It is also understood that the heating element 28 may be eliminated and one could initially operate the engine at a lower efficiency with liquid fuel until a sufficient temperature is reached which would serve to evaporate or vaporize the gasoline.

Shown coupled to the valve 33 is an electronic switch module 34. The module 34 may be a transistor amplifier circuit which serves to supply energizing pulses to the valve 33 to thereby open and close the same to hence control the amount of fuel injected into the evaporation chamber 20. The switch 34 is under control of a selector device 35. Essentially, the selector device operates to supply a selected number of impulses to be applied to the electronic switch 34 to control operation of the valve 33.

Coupled to the input of the selector device 35 is an engine speed detector 36. The speed detector 36 operates to provide a series of pulses or a signal which is a function of the relative speed of the engine and hence supplies a pulse train or signal to the selector device 35 which is indicative of engine speed.

Shown coupled to the selector device 35 is an exhaust sensor 36. The exhaust sensor 36 monitors the exhaust fumes emitted by the engine and will control the duration of time that the valve 33 is opened depending upon the contaminants contained in the exhaust fuel. In this manner, the selector device 35, as will be explained, serves to control the valve 33 as a function of engine speed and as a function of the quality of the exhaust fumes in regard to pollutant content.

Also shown coupled to the selector device 35 is a heat sensing element 37 which may be a thermistor. The thermistor 37 monitors the heat of the heat chamber 21 and varies its resistance according to the temperature. The temperature, as indicated, is a function of the temperature of the exhaust gases and should be maintained at a level to assure efficient vaporization of the fuel in evaporation chamber 20. Hence, the function of the heat sensor 37 is to also control the opening and closing of the valve 33 by the selector device 35 in accordance with the operating temperature of the engine.

The apparatus consisting of the engine speed detector 36, the selector device 35, the electronic switch 34 and the sensors 36 and 37 monitor the engine performance and operate to control the amount of gas injected into the evaporation chamber 20 by controlling the solenoid valve 33. Hence, the vaporization of the gas in regard to the amount is a function of the engine operating conditions as controlled by the above noted components.

Referring to FIGS. 2 and 2A, there is shown an engine speed detecting device 36 which may be employed in monitoring the speed of the engine. It is understood that the device 36 depicted and to be described is one way of monitoring engine speed and other ways such as employing magnetic or photoelectric devices to monitor engine speed are known and may be suitable alternatives.

The engine speed detector 36 includes a frame 40 which is secured to the frame of the automobile and does not move. Centrally located and coaxial with the frame 40 is a shaft 41. The shaft 41 may be coupled directly to the engine shaft or may be, in fact, the engine's shaft.

In any event, the shaft 41 rotates according to the speed of the engine. Shaft 41 has a cam surface 42 integrally formed or otherwise positioned on the shaft.

Located about the periphery of the frame 41 is a series of pressure activated switches as 43 to 46. Each switch consists of two contacts. One contact is coupled directly to the automobile battery 47. The other contact is directed to an associated input of a combining amplifier 48. Hence, each switch as 43 to 46 has one contact coupled to a respective input of amplifier 48. Shown in series with each connection is a suitable trimming resistor as 49 to 52. Hence, switch 46 has a contact coupled to resistor 49, switch 43 has a contact coupled to resistor 50 and so on.

As can be clearly seen from the FIG., each time the shaft 41 completes a rotation, the cam surface 42 makes physical contact with an appropriate arm of each switch. Hence, a number of pulses are generated by each switch which are completely indicative of the engine speed. It is shown in this example that four switches are used and it is understood that more or less may be employed, depending upon the number of pulses to be generated according to the rotation of the shaft 42. Amplifier 48 serves to combine these pulses to produce at an output, a serial pulse train having a repetition rate which is a function of engine speed and which, in this example, would produce four pulses for one rotation of shaft 42. It is thus understood that the number of pulses provided by detector 36 as shown, can vary accordingly. Hence, one can provide four pulses or more or less for one rotation of shaft 41.

The output of amplifier 48 is directed to the input of a first monostable multivibrator 60 and a second multivibrator 61. As is well known, the monostable multivibrator is a device which is triggered by a pulse and produces at an output, another pulse whose width or duration varies in regard to the width or duration of the input pulse.

The monostable multivibrator 60 has its pulse width controlled by the heat sensor 37 of FIG. 1. Hence, the duration of the pulse at the output of the monostable multivibrator 60 is a function of the temperature of the chamber 21. As indicated, the heat sensor 37 may be a thermistor which basically is a resistor whose resistance value varies according to temperature. In the particular case, the resistor 37 is selected so that its resistance decreases as temperature increases.

The output of the monostable 60 is coupled to one input of an OR gate 62. The monostable multivibrator 61 is a similar circuit to monostable multivibrator 60 with the exception that the pulse duration at its output is a function of the exhaust fume content.

Shown in FIG. 2 is a cross-section of the exhaust pipe 25 associated with an automobile. Located in the exhaust pipe is a light emitting cell 63. The cell 63 may be an LED diode and will emit a beam of light upon activation of the same by a bias potential which is obtained from the battery 47.

Adjacent to the light source 63 is a photocell 64. The photocell 64 is a well known device and basically provides a change in resistance according to the intensity of light impinging upon the surface of the cell. Hence, cell 64 is a light variable resistor. The output terminals of cell 64 are coupled to the monostable 61.

Essentially, the circuit described is one of many ways of detecting the exhaust content of the engine and is given as an example of monitoring exhaust content and operates as follows:

Generally speaking, the darker the exhaust fumes from an engine, the more pollutants they contain. Oridinary experience acknowledges the fact that extremely black or dark exhaust fumes are directly indicative of poor engine efficiency and denote the presence of excessive amounts of pollutants. In this manner, if the exhaust fumes are dark, there is less light falling upon photocell 64 from the source 63 and hence, the resistance of the photocell is large. As the exhaust fumes are cleaner, then more light will impinge upon the cell 64 and hence, the resistance of the cell will decrease.

The output of the cell 64 is used as part of a voltage divider. A fixed resistor 66 is coupled to the battery supply $+V$ and has one terminal connected to a terminal of the photocell 64. The other terminal of photocell 64 is coupled to a point of reference potential as ground. Hence, as shown in FIG. 2A, as the exhaust fumes are darker, less light falls on the photocell and the voltage at terminal 75 increases.

The terminal 75 is coupled to the gate electrode of an FET device 76. The field effect or FET 76 is a variable resistance element and the resistance decreases as the voltage on the gate increases. Hence, if the exhaust fumes contain pollutants the width of the monostable 61 decreases, to assure that less fuel is being fed to the evaporation chamber 20.

On the other hand, if the exhaust gases are clear, the resistance of the photocell 64 decreases due to the fact that more light is impinging on the same. A decrease in the resistance of the cell 64 then causes the voltage at terminal 75 to decrease and hence, the resistance of the FET 76 increases. This causes the pulse output of the monostable 61 to increase; thereby delivering more fuel as long as the burn is efficient to allow more vaporization of fuel for a cleaner exhaust.

The output of the monostable 61 is applied to the other input of the OR gate 62. The output of OR gate 62 is applied to the base electrode of a power switch transistor 20. The emitter electrode of transistor 70 is coupled to a point of reference potential while the collector electrode is coupled through a solenoid coil 71 to a source operating potential as derived from the battery 47. The solenoid coil 71 is associated with the solenoid valve as 33 of FIG. 1. Hence, each time transistor 71 is activated, the solenoid valve is opened and thus gasoline is allowed to enter the evaporation chamber 20. The operation of the circuit is relatively simple and will be briefly explained. It is, of course, understood that there are numerous other ways of affording such controls as well as other ways of monitoring various other engine conditions to thence control the amount of fuel injected into the evaporation chamber 20 as described in FIG. 1.

For purposes of explanation, assume that the engine is started in operation and shaft 41 is rotating. A series of pulses indicative of the rotation as explained above, are provided at the output of amplifier 48. These pulses are similarly applied to the inputs of one shot 60 and one shot 61. Initally, the one shots are adjusted so that the pulse width due to temperature, is wider than that due to exhaust fumes. Hence, one shot 60 controls the operation of the valve 33 strictly according to temperature at start-up.

Assume now that exhaust fumes are dark and hence, pollutants are being emitted from the engine which occur, for example, due to the fact that the engine has not reached optimum temperature and hence, the exhaust temperature is insufficient to vaporize the fuel. In this instance, the pulse width applied to the transistor 70 is of a duration to open the valve to allow more gas to be fed to the evaporation chamber. Since the pulses are applied via an OR circuit, the output of the gate 62 will be determined by the wider of the two pulses. As the engine heats up, the resistor 37 decreases in value and hence, the ouput pulse one shot 60 decreases in duration. In any event, the exhaust may still contain pollutants but these pollutants will be less based on a leaner fuel mixture applied to the engine and hence, the output pulse of the one shot 61 will also decrease.

In any event, the two pulses may not decrease by the same amount due to the fact that the exhaust may not be perfectly clean or that the heat of the engine may not be completely sufficient. Thus, the output pulse applied to transistor 70 will again be determined by the wider of the two pulses. As the engine approaches the optimum heating conditions, the fuel will be vaporized and the exhaust will be cleaner. But, as indicated above, the width of the temperature pulse from the one shot 60 is greater and this pulse width will control the opening and closing of the valve 33 primarily. However, as the exhaust fumes become cleaner, the exhaust pulse increases, thus allowing more gas flow to further increase engine efficiency and to allow the efficient burning of fuel. Hence, the only time the exhaust pulse from one shot 61 is wider than the temperature pulse is when exhaust fumes are clean. In this manner, more fuel can be introduced and vaporized in the chamber 20. When the exhaust begins to become slightly polluted, the temperature pulse controls again and hence, one is assured that the engine operates at maximum efficiency; since the vaporization of fuel implies better engine efficiency and a better fuel mixture.

In any event, as can be seen, it is also well known that as the speed of the engine increases, the engine will require more fuel to operate. This is well known as all internal combustion engines burn more fuel at higher speeds. In any event, the fact that the period or frequency of the multivibrator are determined by the pulse derived from the speed detector 36, it is assured that more fuel will be supplied to the evaporation chamber at high speeds due to the fact that the input pulses to both one shots increase in frequency based on the increased rotation of shaft 41. Hence, under these conditions, even though the exhaust is clean and the temperature is sufficient, the engine still receives more gasoline due to the fact that the repetition rate of the pulses is greater. Thus, as can be clearly ascertained, the circuit controls the valve 33 according to temperature, speed and pollutant content and hence, assures that the proper amount of gasoline is introduced into the evaporation chamber according to these considerations.

Referring to FIG. 3, there is shown a schematic diagram of a monostable multivibrator which may be employed for the circuits of 60 and 61. Essentially, the multivibrator shown is well known and has been used in many applications for providing a pulse whose duration varies according to the variation of a resistor which is applied across terminals 70 and 71.

The multivibrator depicted has been described in the literature in great detail and reference is made to a book entitled SOURCEBOOK OF ELECTRONIC CIRCUITS by John Marcus (1968) page 443, McGraw-Hill Publishing Co.

Essentially, the circuit components are indicated directly on the schematic diagram of FIG. 3. The multivibrator shown will operate directly from a twelve volt source which is contained in most automobiles and it is well known that many other configurations of multivibrators to produce variable duration outputs are available and known in the prior art.

It is also understood that many modifications and alternate configurations could be employed to duplicate the components described in conjunction with FIG. 2 and all such modifications and variations are deemed to be within the scope of this invention.

It is also understood that the apparatus depicted is applicable to the use of other fuels besides gasoline and will serve to increase both the efficiency and safety of other engines as operating in the marine environment and so on.

Based on the fact that the vaporization of fuel is monitored and controlled, an engine employing the apparatus depicted will substantially reduce the amount of pollutants emitted by such engines and hence, be compatible with present day environmental considerations.

To further make the operation clear, FIG. 2 shows a mechanical coupling between heat sensor 37 and the lead to the one shot 60. As is known, there are a wide variety of thermostatic switches and these switches will operate to open or close at a given temperature.

In an alternate embodiment, once the temperature of the engine is hot enough to vaporize fuel, the thermostat 53 opens the lead to one shot 60. One shot 60 cannot operate. In this mode, the exhaust circuit completely controls. Hence, as the exhaust gas becomes darker, less light falls on photocell 64 and its resistance increases, the voltage on the FET 75 increases and the resistance descreases and so does the pulse width of one shot 61. Thus, gas is now fed to the chamber 20 at a lesser rate only controlled by exhaust gas content to therefore allow less gas to the chamber to therefore assure that less gas is burned. This is done without any further control by the termperature sensor 37 due to the operation of the thermostat 53. As exhaust gases become cleaner, the pulse width of the exhaust one shot will increase to a level to enable efficient operation (enough pulses and width to assure that the chamber 20 receives enough gas for normal conditions). The maximum width is, of course, selected for this operation. If the temperature falls, the thermostat 53 will close the connection between 48 and one shot 60 and cause the temperature mode to again control as described.

Hence, there are many variations employed in this invention which monitor and control the feed of gas to the evaporation chamber according to efficiency of the engine.

I claim:
1. A fuel delivery system apparatus for use with an internal combustion engine, the combination therewith comprising:
  (a) a fuel evaporator comprising a hollow chamber having an inlet port for receiving a liquid fuel, and an outlet port communicating with said inlet port, said hollow chamber surrounded by an outer heat chamber with a plurality of heat conducting fins coupled about said inner chamber and located in said heat chamber, said heat chamber having an inlet port for receiving hot exhaust fumes from said engine and an outlet port for discharging said fumes, with said fumes operative to heat said fins and therefore said hollow chamber and any liquid fuel contained therein,
  (b) temperature sensing means coupled to said outer heat chamber to monitor the temperature of operation of the evaporator,
  (c) exhaust gas sensing means coupled to one of said ports of said heat chamber to monitor the pollutant content of said exhaust fumes,
  (d) fuel supply means having an input conduit coupled to said inlet port of said hollow chamber for introducing fuel thereto,
  (e) selective valve means located between said conduit and said inlet port and operative in a first position to allow fuel into said chamber and in a second position to restrain flow,
  (f) speed detecting means coupled to said engine, said speed detecting means including a rotatable shaft coupled to said engine, said shaft having a cam projection on a surface thereof, a plurality of switches positioned about said shaft and operated by said cam projection during rotation of said shaft to provide a plurality of pulses at an output during each revolution of said shaft, said pulses indicative of a first control signal manifesting the speed of said engine, with the number of said pulses during each revolution always equal and independent of the speed of said engine,
  (g) a first monitoring means responsive to said first control signal and coupled to said temperature sensing means to provide a first series of output pulses each of a given initial duration during engine start-up greater than that of said pulses indicative of said first control signal, with the duration of said pulses varying according to the temperature of said evaporator,
  (h) a second monitoring means responsive to said first control signal, and coupled to said exhaust gas sensing means to provide a second series of output pulses each of a duration determined by said exhaust gas content, with an initial duration during engine start-up selected to be less than that duration of said pulses of said first monitoring means,
  (i) means for combining said first and second pulse trains, to provide an output signal indicative of the wider of the two pulses during engine operation,

(j) means for coupling said output signal of said combining means to said selective valve means to control fuel flow in said chamber according to said output signal, whereby fuel entering said chamber via said inlet port is preheated by said chamber in an amount according to said operation of said selective valve means to provide preheated fuel at said outlet port for applying the same to the carbureator of said engine.

2. The apparatus according to claim 1 wherein said means for coupling said output signal to said selective valve means includes switching means operative in a first position to cause said valve means to allow fuel flow and in a second position to restrain flow.

3. The combination of apparatus according to claim 1 further including an additional heating source coupled to said evaporation chamber and operative to heat the same relatively independent of said exhaust gases.

4. The combination of apparatus according to claim 1 wherein said exhaust gas sensing means includes a photocell located in an exhaust gas conduit and means for illuminating said photocell through said exhaust gases to cause said cell to provide an output proportional to the pollutants contained in said exhaust gases.

5. The combination of apparatus according to claim 1 wherein said speed detecting means coupled to said engine provides a first control signal including a plurality of pulses at a frequency determined according to said speed.

6. The combination of apparatus according to claim 1 wherein said temperature sensing means and said exhaust gas sensing means include a monostable multivibrator having a trigger input coupled to said output of said speed detecting means.

7. The combination of apparatus according to claim 1 wherein said temperature sensing means includes means for disabling operation of the same during engine operation when the temperature of said heat chamber reaches a predetermined value, whereby said control of said selective means is accomplished primarily according to the output of said exhaust sensing means.

8. The combination according to claim 6 wherein the pulse duration of said monostable multivibrator associated with said exhaust sensing means is controlled by a field effect transistor.

* * * * *